United States Patent [19]

Auda et al.

[11] Patent Number: 5,552,096
[45] Date of Patent: Sep. 3, 1996

[54] MULTIPLE REACTION PROCESS IN MELT PROCESSING EQUIPMENT

[75] Inventors: Richard S. Auda; William M. Davis, both of Westfield; David Y. Chung, Edison; Lawrence W. Flatley, Somerville, all of N.J.; Brenton G. Jones, Overijse, Belgium; Donald A. White, Edison, N.J.; Hans G. Woudboer, Bonn-Bad Godesberg, Germany

[73] Assignee: Exxon Chemical Patents Inc., Wilmington, Del.

[21] Appl. No.: 454,998

[22] Filed: May 31, 1995

Related U.S. Application Data

[62] Division of Ser. No. 382,336, Feb. 1, 1995, which is a division of Ser. No. 989,289, Dec. 11, 1992, Pat. No. 5,424,367, which is a continuation-in-part of Ser. No. 807,282, Dec. 13, 1991, abandoned.

[51] Int. Cl.$^6$ .............................. B29C 47/78; C08F 4/00
[52] U.S. Cl. .............. 264/85; 159/2.1; 264/102; 264/176.1; 264/211.24; 525/242; 525/267; 525/285; 526/65; 526/71
[58] Field of Search ............. 526/65, 71; 525/285, 525/267, 242; 264/176.1

[56] References Cited

U.S. PATENT DOCUMENTS

| | | | |
|---|---|---|---|
| 4,384,072 | 5/1983 | Newman et al. | 525/356 |
| 4,500,706 | 2/1985 | Mathis et al. | 528/502 |

*Primary Examiner*—Morton Foelak
*Assistant Examiner*—Terressa M. Mosley
*Attorney, Agent, or Firm*—Douglas W. Miller; J. E. Schneider

[57] ABSTRACT

Multiple sequential chemical reactions on a polymeric feedstock are carried out in an extruder with multiple reaction zones. Each reaction zone has means for introduction of reagents, for mixing of reagents with polymer and for removal of by/co-products or unreacted reagents.

19 Claims, 2 Drawing Sheets

MULTIPLE REACTION PROCESS IN MELT PROCESSING EQUIPMENT

This is a divisional, of application Ser. No. 08/382,336, filed Feb. 1, 1995 which is a divisional of U.S. Ser. No. 07/989,289 filed Dec. 11, 1992 now U.S. Pat. No. 5,424,367 which is a continuation in part of Ser. No. 07/807,282 filed Dec. 13, 1991 now abandoned.

TECHNICAL FIELD

Multiple sequential chemical reactions on a polymeric feedstock are carried out in an extruder with multiple reaction zones. Each reaction zone has means for introduction of reagents, for mixing of reagents with polymer and for removal of by/co-products or unreacted reagents.

BACKGROUND ART

Graft reaction via melt processing equipment such as single or multiple screw extruders, rubber masticators, Banbury processors, Brabender processors, roll-mills and the like, includes well-known technology and is widely reported in the technical literature. Similarly, post-graft reactions with the graft polymers are also widely reported. Thus, the graft reaction of unsaturated carboxylic acid or carboxylic acid derivatives with thermoplastic polymers capable of subsequent chemical reaction for use in such as lubricating oil compositions or thermoplastic blend compositions has become an important field of ongoing development. The following patent art addresses such graft reactions, particularly one suitable for the preparation of lubricating oil additives.

U.S. Pat. No. 3,862,265 addresses degradation in molecular weight to achieve narrow molecular weight distribution, and optional free-radical initiated graft reaction of unsaturated monomers with, for example, ethylene-propylene copolymer by use of melt processing procedures in an extruder reactor. Intensive mixing of free radical initiator and graft reactants with molten polymers is achieved by the use of either decompression zones or thin film zones in the extruder. An additional suggestion for product quality improvement is that of capping the reaction zone to prevent escape of gaseous reactants, and accompanying that with subsequent venting under reduced pressure to remove vaporous components. The suggestion is further given that subsequent reaction in the extruder can modify the graft-monomer-containing polymers, specifically such subsequent reactions as those of esterification, neutralization, amidization and imidization.

U.S. Pat. No. 4,320,019 describes the preparation of lubricating oil additives that are reaction products of interpolymers, of ethylene, $C_3$–$C_8$ alpha olefins, and polyenes that are first reacted in an oil solution with olefinic carboxylic acid compositions, and then with an amine. The reaction of the interpolymer with the acid compositions are conducted at temperatures and conditions designed to avoid molecular weight degradation. It is said that unreacted materials can be removed by vacuum stripping from the oil solution. The reaction with amine is generally taught to be conducted in solvent in subsequent steps.

U.S. Pat. No. 4,670,173 describes the preparation, under either solvent-free or solution based conditions, of lubricating oil additive compositions that are the reaction product of an (D) acylating reaction product, a (F) polyamine and a (G) mono-functional acid. The (D) acylating reaction product is prepared by reacting a (A) hydrogenated block copolymer and (B) alpha-beta olefinically unsaturated carboxylic reagent in the presence of (C) free radical initiators. The solvent-free reaction can be conducted in an extruder with high mechanical energy to achieve necessary chain scission, though such is said not to be usually desired. The (D) acylating reaction product is dissolved in solution, separated and dried, desirably with removal of unreacted (B) carboxylic agent such as vacuum stripping. A subsequent solvent-free reaction with a primary amine compound in an extruder is described, see Example 10 of U.S. Pat. No. 4,670,173.

U.S. Pat. No. 4,749,505 similarly addresses the preparation of lubricating oil additive compositions by melt processing reaction and simultaneous degradation of ethylene copolymers containing $C_3$–$C_8$ alpha olefins, and optionally, non-conjugated diolefins. The melt processing reaction is conducted under nitrogen in the presence of a free radical initiator with an optional simultaneous grafting of ethylenically unsaturated carboxylic acids or nitrogen containing monomers. If carboxylic acid is grafted, a subsequent reaction with an amine or hydroxy component is said to be possible with undiluted graft copolymer, in a separate reaction vessel. Nitrogen purging of the initially formed carboxylic acid grafted copolymer prior to the addition of oil diluent for subsequent reaction with a primary amine is described in Example 2.

European Patent Application publication 0 422 728 A1 describes an extruder process for preparing a dispersant viscosity index improver aminated polymer comprising the steps of (a) free radical grafting of an alpha-beta unsaturated carboxylic acid moiety onto either of (i) selectively hydrogenated block copolymers of conjugated diene and monoalkenyl arenes or (ii) hydrogenated polymers of conjugated diolefins, and (b) reacting the functionalized polymer with an amine. The graft functionalization of step (a) is done under conditions of high energy mixing in the presence of 3.0% to 15% by weight of polymer of diluent oil. Additionally, the free-radical initiator is added after the carboxylic moiety to avoid cross-linking and coupling. Removal of a portion of unreacted carboxylic acid reagent, 20–80%, and as well reaction by-products and unreacted amine, is described by vacuum assisted venting after the graft reaction zone in which the amine is reacted with the acid grafted polymer.

As demonstrated in the technical literature discussed above, it is of continuing importance to provide functionalized thermoplastic copolymers and to provide cost-effective means of preparing them while minimizing or eliminating undesirable by-products that can adversely affect subsequent reactions and utility in end-use applications. In particular, it is important in the preparation of lubricating oil additives to eliminate unreacted carboxylic acid reagent, free-radical initiator decomposition products, low molecular weight oligomers, by-products created when unreacted amine reacts with non-grafted carboxylic acid. Further, the artionic polymerization of unsaturated carboxylic acid moieties in the presence of certain highly polar reactants, e.g., Polyamines that are desirable otherwise in many applications, not only competes with desired reactions but can create polymeric by-products that are not easily removed by vacuum venting alone at the temperatures and pressure optimal for the thermoplastic melt processing.

It is thus a principle object of this invention to provide an efficient and cost-effective means of preparing functionalized thermoplastic polymers in neat form requiring none to minimal purification subsequent to preparation by the present process. Another object of the invention is the economic preparation of certain graft polymers that are useful in lubricating oil compositions as multifunctional viscosity modifiers and other graft polymers that are useful as modifiers for engineering thermoplastics. Additional objectives will occur readily to those skilled in the art from the following specification which describes the invention in detail.

SUMMARY OF THE INVENTION

The invention relates to a process for carrying out multiple sequential reactions in a single reactor. It comprises of reacting a polymer melt (typically in the absence of a solvent or diluent) with a first set of reagents, stripping or otherwise removing any reaction by-products and unreacted reagents from the polymer melt and then reacting the polymer melt with a second and different set of reagents. This process of conducting reactions and then purifying the polymer can be repeated until the desired final product is obtained. The key feature of the process is the removal from the polymer melt or neutralization of volatile impurities such as the unused reagents, by-products and coproducts from one reaction before a subsequent reaction occurs. By practice of this -invention, a polymer melt which enters a reaction zone is relatively free of possible contaminants which may have resulted from the preceding reaction zone.

The preferred means of removing impurities is the use of one or more vents. In this embodiment, base polymer is fed into an extruder reactor. After the polymer has melted, it enters a reaction zone where one of the desired sequential reactions takes place. After allowing for sufficient time to permit the first reaction to go to the desired conversion, the melted polymer enters a vent zone where any unreacted reagents and by-products and other impurities associated with the reaction are removed. The vent zone is isolated from the reaction zone to prevent loss of reagents from the reaction zone. The vent zone comprises one or more vents separated from each other. To aid in the removal of the reagent and by-products, the vents may be under negative pressure and an inert stripping gas, such as nitrogen, may be introduced. After the melted polymer leaves the first vent, it may enter a second vent where substantially all the remaining unreacted reagent by-products and other volatile impurities are removed from the melt. This second vent is isolated from the first vent so that the two act independently. Again, negative pressure and stripping gases may be used to facilitate the removal of the unwanted compounds.

Once the melted polymer has passed through the vent zone for the first reaction, which may comprise two vents in series, it then enters the second reaction zone where the next reaction of the series takes place. The second reaction zone is isolated from the first reaction vent zone to prevent loss of reagents through the vent(s) and to prevent the reaction of the second reagent with any unreacted first reactant or by-products of the first reaction. As with the first reaction zone, the second reaction zone is of sufficient length to allow enough time for the second reaction to go to the desired conversion.

At the end of the second reaction zone, a vent zone similar to that described previously, is provided to remove any unreacted second reactant and by-products from the second reaction. If a third reaction is to take place in the extruder, a vent system similar to that found between the first and second reaction zones should be used.

DETAILED DESCRIPTION OF THE INVENTION

Figure 1:
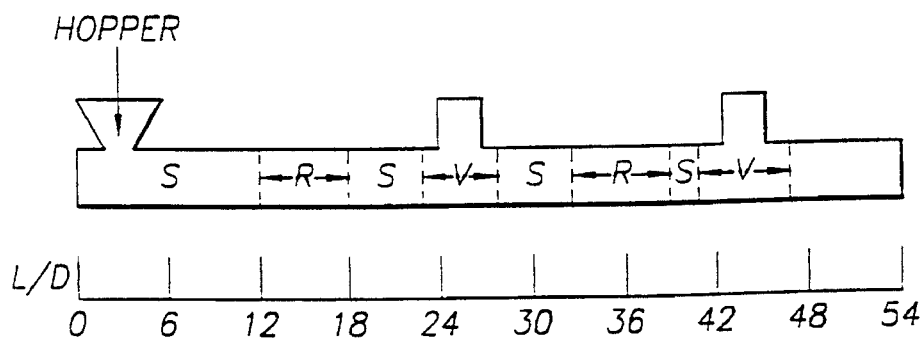
FIG. 1 is a schematic drawing of the extruder-reactor configuration used for examples I through IV.

The heart of the invention disclosed and claimed herein centers around the extruder-reactor. The extruder-reactor has been designed to permit the elastomer or thermoplastic polymer to go through a series of sequential and different reactions in a single reactor with the unreacted reactants and by-products from one reaction being removed from or neutralized in the polymer before the next reaction begins. This is accomplished by conducting each reaction in a separate reaction zone and providing the proper purification or neutralization between each reaction zone. A twin screw extruder is preferred.

A typical extruder reactor of the invention would have the following configuration.

(A) Feed Zone in which the polymer is introduced into the extruder reactor in convenient form. This form includes, for example, pellets, particles from bales of polymer which have been comminuted and crumbs from the finishing line of a rubber manufacturing plant, each of which can be dry or may contain a low level of water, e.g. about 0 to 15 wt. %, preferably about 0 to 5.0 wt. %, most preferably about 0 to 1 wt. %.

In some cases, it may be necessary to subject the polymer to a drying step before it enters the extruder reactor in order to obtain a feed polymer with a low and consistent level of moisture. One method of accomplishing this is to pass the polymer through a drying extruder. In this scenario, the polymer which is fed into the feed zone will already be molten and will be in the form of a hot rope or sausage.

The feed zone is designed to form the polymer feed into a cohesive mass and convey or pump the mass past a restrictive dam which follows the feed zone and distinguishes it from the first reaction zone. This operation should be conducted at low shear and temperature consistent with the desired result and at a pressure sufficient to convey the mass, typically up to about 600 psig, preferably up to about 400 psig, most preferably to about 200 psig or less. Lower pressures are preferred to avoid overheating the polymer. This can be achieved, e.g., by utilizing an extruder screw with relatively steep flights and by keeping the length of the feed zone, i.e., the length of the feed zone screw, as short as possible, commensurate with the desired production rates.

A restrictive dam is used to separate the feed zone with the first reaction zone which follows it so as to prevent back leakage of reactants. This dam is not restrictive enough, however, to cause excessive overheating of the polymer. A restrictive dam can be, for example, a reverse flight screw section, a filled screw section, a shallow flighted screw section, an unflighted screw section, combinations thereof, or other means known in the art. If an unflighted section is used, it can have a larger diameter than the root diameter upstream of it, for example 5–25% larger, but not greater than the screw flight diameter. The restrictive dam length should be from about 0.1 to 6 screw diameters, preferably about 0.3 to about 3 screw diameters, and most preferably about 0.5 to about 2 screw diameters in length. If a reverse flighted screw section is employed, it can be single or multiflighted, preferably multiflighted.

(B) First Reaction Zone is the part of the extruder reactor where the first of the sequential reactions take place. The reagents for this reaction zone are added and are combined with the polymer by extensive and intensive mixing. A description of these types of mixing can be found in U.S. Pat. No. 3,862,265 which is hereby incorporated by reference.

It should be noticed that where the restrictive dam configuration employed is more than a mere separation boundary region between zones, for example, more than merely an unflighted screw section, the restrictive dam can be considered part of the reaction zone itself, for example, when a single or multiflighted reverse flighted screw section is employed. Under such circumstances, the restrictive dam in this region can be part of or comprise the reaction zone. When the reaction zone is operated under a vacuum, the restrictiveness of the dam between the feed and reaction zone can be reduced so as to permit some gas (e.g. air) flow into the reaction zone from the feed zone.

Following the first reaction zone, a second restrictive dam similar to that described above is placed. This prevents premature loss of the reagents from the first reaction zone.

(C) Purification Zone—This is the region where the unreacted reagents, by-products, coproducts and other volatile impurities from the first reaction are removed from the polymer before it enters the second reaction zone. One preferred means of purifying the polymer is through use of a vent zone. Such vent zone comprises one or more vents with optional vacuum systems to reduce pressure and assist in the stripping of the volatile impurities from the polymer. In the case of multiple vents within a vent zone, the vents are separated from each other by restrictive dams similar to those described above. Use of the vacuum system helps lower the boiling point of the volatile impurities and facilitates their removal.

To further assist the removal or stripping of unreacted reactants, by-products and coproducts, nitrogen may be injected into the polymer just before or just after the vents. The use of nitrogen stripping is particularly helpful in the removal of low molecular weight materials and lowers the vapor phase partial pressure and improves mass transport.

The use of two vents in series increases the effectiveness of the stripping. For example, for stripping following a acylation reaction, the first vent will remove approximately 80–90 % of the impurities and the second vent 9–16% leaving a polymer in which 96–99 % of the impurities have been removed. Thus the elastomer which enters the second reactor is relatively pure.

(D) Second Reaction Zone—This is the zone where the second reaction of the reaction series takes place. It is separated from the vent zone by a restrictive dam similar to that described above. The configuration of this zone is similar to the first zone although specific arrangements will be dictated by the reaction to take place.

(E) Second Purification Zone—This is the region where the unreacted reagents, by-products, coproducts, and other volatile impurities from the second reaction are removed from the polymer before it enters a third reaction zone or the Exit Zone. The configuration may be similar to the first purification zone discussed above.

Additional reaction and purification zones may follow for subsequent reactions that may be desired and the configuration of these zones would follow that described above.

(F) Exit Zone—After the last purification zone, the polymer may go through a single screw extension to build up sufficient pressure to extrude the polymer through a die to be cut by an underwater pelletizer. Other exit media such as a turbulator: a strand bath or a gear pump may be used. In applications in which rapid cooling of the product is desired, an underwater pelletizer is preferred. Its advantageous use is illustrated in the examples below.

The reactions which can he carried out using the process of the invention are those sequential reactions which are amenable to being conducted in an extruder reactor and where the removal of the reagents and by-products of one reaction is necessary or desirable before the subsequent reaction occurs. Typical of the reactions which can take place using the process of the invention are:

(a) Maleation of a polyolefin in the first reaction zone followed by imidization of the maleated polyolefin in the second reaction zone;

(b) peroxide induced reduction of the molecular weight of a polyolefin in the first reaction zone, maleorion of the low molecular weight polyolefin in the second reaction zone and imidization of the maleated low molecular weight polyolefin in the third reaction zone:

(c) Benzylic halogenation of an isobutylene alkylstyrene copolymer in the first reaction zone followed by nucleophilic displacement of the benzylic halide, including reaction with nucleopnilic functionalities in an engineering thermoplastic, in the second reaction zone (d) peroxide initiated reduction of molecular weight of an isubutylene alkylstyrene copolymer in the first reaction zone, benzylic halogenation of the low molecular weight copolymer in the second reaction zone and nucleopnilic displacement of the benzylic halide in the third reaction zone.

(e) halogenation of butyl rubber in the first reaction zone, dehydrohalogenation of the rubber in the second reaction zone to create conjugated diene buryl rubber (CDB) and reaction of the CDB with maleic anhydride in the third reaction zone.

(f) peroxide induced reduction in molecular weight of a polyolefin in the first reaction zone followed by an addition reaction of the terminal olefinic double bonds of the low molecular weight polyolefin in the second reaction zone.

Other possible reactions will be readily apparent to those skilled in the art. In general, the reagents may be simple molecular compounds, however, they may also include polymeric compounds such as polyamides and other engineering thermoplastics.

The methods for conducting these reactions singly in an extruder reactor are well known in the art. For example, the maleation of an ethylene-propylene copolymer is disclosed in U.S. Pat. No. 3,862,265, the disclosure of which is hereby incorporated by reference. This U.S. Patent also discloses methods for reducing molecular weight of polyolefins. Halogenation in an extruder reactor is disclosed in U.S. Pat. Nos. 4,486,575 and 4,384,072, the disclosure of which is hereby incorporated by reference.

Polymers useful in the practice of this invention can be categorized in various ways and include:

(a) olefin polymers, such as the various forms of polyethylene, ethylene-propylene co-polymers, other ethylene copolymers with comonomers such as 1-butene, isobutylene, vinyl acetate, maleic anhydride, ethyl acrylate, methyl acrylate: generally alpha-olefin and cyclic olefin homopolymers and copolymers;

(b) polymers from dienes, such as styrenebutadiene rubber, polychloroprene (neoprene), butyl, polybutadiene, polyisoprene, butadiene-acrylonitrile (Nitrile), ethylene-propylene diene terpolymers (EPDM), styrene-diene copolymers made by anionic polymerization including block and star-branched copolymers and hydrogenarea styrene-diene copolymers, substantially hydrogenated isoprene linear and star-branched polymers;

(c) vinyl and vinylidene polymers, such as polyvinyl chloride and its family of copolymers, polyvinyl esters such as polyvinyl acetate, acrylic polymers such as polymethylmethacrylate, polystyrene and its family of copolymers such as butadiene-styrene, styrene-acrylonitrile, styrene-isoprene, acrylonitrile-butadiene-styrene;

(d) heterochain thermoplastics, such as polyamides, polyesters, polyethers, polysulfides, polyurethanes, polycarbonates.

Unsaturated polymers useful in the present invention include ethylenically unsaturated elastomers, e.g., the several rubbers of commercial significance, for example, butyl rubber, EPDM rubber, styfete butadiene rubber (SBR), polyisoprene rubber and poly(butadieneisoprene) copolymer rubbers.

The butyl rubber copolymers useful in the present invention contain a major proportion, preferably at least 70 wt. %, of isoolefins and a minor proportion, preferably not more than about 30 wt. %, of multi-olefins. Copolymers of this general type, especially where the copolymer contains about 85–99.5% (preferably 95–99.5%) of a $C_4$–$C_7$ isoolefin, such as isobutylene, with about 15–0.5% (preferably about 5–05 wt %) of a multi-olefin of about 4–14 carbon atoms, are commonly referred to in patents and literature as "butyl rubber"; see, for example, the textbook *"Synthetic Rubber"* by G. S. Whitby (1954 edition by John Wiley and Sons, Inc.), pages 608–609, *"Encyclopedia of Chemical Technology"*, Third Edition, volume 8, (1979), pages 470–484, etc. The expression "butyl rubber" as employed in the specification and claims is intended to include copolymers containing about 80–99% by weight of an isoolefin of about 4–7 carbon atoms and about 20–1% of conjugated multi-olefin of about 4–10 carbon atoms. The preparation of butyl-type rubbers is amply described in the literature. In general, it consists of the reaction product of a $C_4$–$C_7$ isoolefin (preferably isobutylene) with a $C_4$–$C_{10}$ (preferably a $C_4$–$C_6$) conjugated diolefin, such as isoprene, butadiene, dimethyl butadiene, piperylene, etc. The reaction product of isobutylene and isoprene is preferred. The preparation of butyl rubber is described in U.S. Pat. No. 2,356,128 which is incorporated herein by reference.

Conventional high molecular weight butyl rubber generally has a number average molecular weight of about 25,000 to about 500,000, preferably about 80,000 to about 300,000, especially about 100,000 to about 250,000; and a Wijs Iodine No. of about 0.5 to 50, preferably 1 to 20. More recently low molecular weight polymers have also been prepared which have number average molecular weights of from 5,000 to 25,000 and unsaturation expressed as mole %, of 2–10.

The term "EPDM" as used in the specification and claims is used in the sense of its ASTM definition and is intended to mean a terpolymer containing ethylene and propylene in the backbone and diene enchainment with residual unsaturation in the side chains. Illustrative methods for producing these terpolymers are found in U.S. Pat. No. 3,280,082, British Pat. No. 1,030,989 and French Pat. No. 1,386,600 which are incorporated herein by reference.

The preferred EPDM polymers contain about 30 to about 80 wt. % ethylene and about 0.5 to about 10 wt. % diene monomer. The balance of the polymer is propylene. The diene monomer is a non-conjugated diene. Illustrative of these non-conjugated diene monomers which may be used in the terpolymer (EPDM) are hexadiene, dicyclopentadiene, ethylidene norbornene, methylene norbornene, propylidene norbornene and methyltetrahydroindene. A typical EPDM containing ethylidene norbornene as a diene monomer is VISTALON® 4608 (Exxon Chemical Company, U.S.A.), a polymer having a Mooney viscosity at 260° F. of about 62, and an ethylene content of about 48 wt. %. When the present process is used to manufacture multifunctional viscosity modifiers, the preferred EPDM polymers should contain at least 40 wt % of ethylene. Where the EPDM polymers are to be used to manufacture pelletized multifunctional viscosity modifiers, the ethylene content should be at least 60 wt % for polymers with a narrow molecular weight distribution ($\overline{Mz}/\overline{Mw}<2.0$) and at least 65 wt. % for polymers having a broad molecular weight distribution.

The polyisoprene rubber referred to in this invention may be natural rubber or synthetic polyisoprene prepared by processes well known in the art, and, in general, has a molecular weight of from about 500 to about 500,000, preferably about 1500 to about 200,000.

The polybutadiene and poly(butadiene-isoprene) copolymer rubbers referred to in this invention include the geometric isomers thereof, all of which may be prepared by processes well known in the art. In general, such polymers and copolymers have a molecular weight of from about 500 to about 500,000, preferably from about 1500 to about 200,000. Generally, polybutadiene rubbers have Mooney viscosity values, measured at 212° F., of from about 25 to about 65, preferably from about 35 to about 55, most preferably from about 40 to about 50.

The styrene butadiene rubber referred to in this invention is also known as poly(butadiene-co-styrene), and typically abbreviated SBR, and includes rubbers prepared by the emulsion (hot and cold) and solution processes well known in the art. Bound styrene levels are from about 3 to about 50 wt. %, preferably from about 10 to about 45 wt. %, most preferably from about 12 to about 30 wt. %, for example, 23.5 wt. %. Generally, such polymers have Mooney viscosity values, measured at 212° F., of from about 20 to 130 and above, preferably from about 35 to about 80, most preferably from about 40 to about 70, for Example 52.

The butadiene in such copolymers is present as all three geometric isomers, cis-1,4, trans-1, 4 and 1.2 or vinyl and the copolymer can be random, block or graft.

The elastomers or rubbers referred to above and processes for their preparation are generally described in the Kirk-Othmer *"Encyclopedia of Chemical Technology"*. Third Edition, Volume. 8, (1979), buryl p. 470 ff, EPDM p. 492 ff, polybutadiene p.546 ff, polyisoprene p. 582 ff and poly (butadiene-co-styrene) p. 608 ff, incorporated herein by reference.

Saturated polymers useful in the practice of the instant invention include olefin polymers such as high and low density polyethylene (HDPE and LDPE) and linear low density polyethylene(LLDPE) copolymers of ethylene such as ethylene-vinyl acetate, and polyvinyl and vinyl polymers, for example, polyvinyl chloride.

HDPE has a density of about 0.941 to about 0.965 g/cc. High density polyethylene is an established product of commerce and its manufacture and general properties are well know in the art. Typically, HDPE has a relatively broad molecular weight distribution, characterized by the ratio of weight average to number average molecular weight, of from about 20 to about 40. LDPE is, similarly, an item of commerce, and typically includes products with densities in the range of about 0.910 to about 0,925 g/cc. Medium density polyethylene should not be excluded as a useful polymer, e.g., about 0. 925 to about 0. 940 g/cc.

Linear low density polyethylene (LLDPE) is a relatively new class of low density polyethylene characterized by little, if any, long chain branching, in contrast to conventional low density polyethylene. The processes for producing LLDPE are well known in the art and commercial grades of this polyolefin plastic are available. Generally, it is produced in gas-phase fluidized bed reactors or liquid-phase solution process reactors: the former process can be carried out at pressure of about 100 to 300 psi and temperatures as low as 100° C. Polymers can be made in the gas phase with melt indices and densities over the full commercial range and with molecular weight distributions from very narrow to very broad.

Polyethylene copolymers include copolymers of ethylene and alpha-olefins having 3 to 16 carbon atoms, for example, propylene, 1-butene, etc. Also included are copolymers of ethylene with an unsaturated ester of a lower carboxylic acid. In particular, copolymers of ethylene with vinyl acetate or alkyl acrylates, for example, methyl acrylate and ethyl acrylate, are employed. For the purposes of this invention, polyethylene copolymers are also considered to include blends of polyethylene and polyethylene copolymers. Many such ethylene copolymers are available as items of commerce and their composition and methods for producing them are well known in the art.

The preferred polyolefins are those polymer backbones prepared from ethylene and alpha olefins containing from 3 to 28 carbons, e.g., 3 to 18 carbons. These ethylene copolymers may contain from 15 to 80 wt. % ethylene, preferably 20 to 80 wt. % ethylene and more preferably 30 to 80 wt. % of one or more $C_3$ to $C_{28}$ preferably $C_3$ to $C_{18}$, more preferably $C_3$ to $C_8$ alpha olefin. While not essential, such polymers preferably have a degree of crystallinity of less than 25 wt. % as determined by x-ray and differential scanning calorimetry. Copolymers of ethylene and propylene are most preferred. Other alpha-olefins suitable in place of propylene to form the copolymer, or to be used in combination with ethylene and propylene, to form a terpolymer, tetrapolymer, etc., include 1-butene, 1-pentene, 1-hexene, 1-heptene, 1-octene, 1-nonene, 1-decene, etc; also branched chain alpha-olefins, such as 4 methyl-1-pentene, 4-methyl-1-hexene, 5 methyl pentene-1, 4.4 dimethyl-1-pentene, and 6 methylheptene-1 and mixtures thereof.

Polyvinyl chloride (PVC) is the most commercially significant member of the polyvinyl and vinyl copolymer family which comprises various polymers based on the vinyl radical or vinylidene radical. Vinyl chloride has been copolymerized with materials such as vinyl acetate, acrylic esters and vinylidene chloride. More recently other polymers have been grafted to polyvinyl chloride including ethylene vinyl acetate and EPDM. PVC is manufactured commercially using various well known polymerization processes: suspension, mass, emulsion/dispersion and solution: the first is the predominant method. The product is available in several forms including particles, fine powders and latexes.

Other polymers useful in the present invention are hydrogenated homopolymers and copolymers of conjugated diolefins containing from 4 to 12 carbon atoms, and hydrogenated copolymers of one or more conjugated diolefins and one or more monoalkenyl aromatic hydrocarbons containing from 8 to 16 carbon atoms. The base polymer may be of a star or linear structure. Hydrogenated polymers may be hydrogenated selectively, completely or partially. Hydrogenated polymers of conjugated diolefins and copolymers of conjugated diolefins and monoalkenyl arenes are preferably hydrogenated such that greater than 90 percent of the initial ethylenic unsaturation is removed by hydrogenation. Preferably, the hydrogenated polymers are substantially free of ethylenic unsaturation.

In the preferred embodiment, the process of the invention is first used to graft a functional compound onto a polyolefin backbone in a first reaction zone. The functional compound is then reacted with a reactive compound in a subsequent reaction zone. The grafting reaction is initiated by a free radical initiator which is preferably an organic peroxygen compound. Especially preferred peroxides include 2,5-dimethyl-2,5-di(t-butylperoxy)-3-hexyne (LUPERSOL® 130) and 2,5-dimethyl-2,5-di(t-butylperoxy)hexane (LUPERSOL® 101); 1,3 bis(t-butlperoxyisopropyl)benzene (PERKDOX® 14) and di(t-butyl) peroxide.

The preferred functional compounds are unsaturated mono— and poly-carboxylic acids ($C_3$–$C_{10}$) and cyclic anhydrides, salts, esters, imides, amides, nitriles, and other substituted derivatives from said acids.

Examples of such acids, anhydrides and derivatives thereof include maleic acid, fumaric acid, himic acid, itaconic acid, citraconic acid, mesaconic acid, acrylic acid, methacrylic acid, crotonic acid, isocrotonic acid, angelic acid, maleic anhydride, himic anhydride, sodium acrylate, calcium acrylate, magnesium acrylate, dibutyl fumarate, maleimide, N-alkyl- and N-aryl-maleimides, acrylamide and methacrylamide. The preferred grafted functional compound is maleic anhydride.

The reactive compounds which can be used to react with the grafted functional compound will, of course, depend on the nature of the grafted functional compound. In the case of the preferred grafted functional compound, maleic anhydride, those that will react advantageously with anhydride functionality are appropriate. This includes alcohols, thioalcohols, and amines. Of these, amines are preferred. Primary amines are more preferred because of the stability of the imide products formed. Most preferred are primary amines, $RNH_2$, in which the R group contains functionalities that it is desired to have in the final product. Although such products contain two functionalities, the imide functionality formed by reaction of the primary amine is relatively inert and serves as a stable linkage between the functionality in the R group and the polymer backbone.

Functionalities that are desirable for inclusion in the product through inclusion in the R group of the primary amine, $RNH_2$, will depend on the application for which the product is intended. In the examples below application of the product as a multifunctional viscosity modifier for automotive lubricating oil is illustrated. In this application it is desired that the R group of the primary amine $RNH_2$ contain tertiary amine functionality. In another application, providing improved blends of styrene/maleic anhydride copolymers and polypropylene, disclosed in U.S. application Ser. No. 733, 561, it is desired to have secondary amine functionality introduced into the polymer by use of a primary amine, $RNH_2$, in which the R group contains secondary amine functionality. In other applications other functionalities may be desired such as alcohol functionality.

Examples of useful primary amines, $RNH_2$, in which the R group contains tertiary amine functionality include:

N, N-dimethylethylenediamine

N, N-diethylethylenediamine

N, N-dimethyl-1,3-propanediamine

N, N-diethyl-1,3-propanediamine 4-aminomorpholine 4-(aminomethyl)pyridine 4-(2-aminoethyl)morpholine 4-(3-aminopropyl)morpholine Examples of useful primary amines, RNH$_2$, in which the R group contains secondary amine functionality include:

N-methylethylenediamine,

N-ethylethylenediamine,

N-phenylethylenediamine,

N-methyl-1,3-propanediamine,

N-phenyl-1,2-phenylenediamine,

N-phenyl-1,4-phenylenediamine, 1-(2-aminoethyl)piperazine, 4-(aminomethyl)piperidine, Examples of useful primary amines, RNH$_2$, in which the R group contains alcohol functionality include:

ethanolamine 2-amino-1-propanol 3-amino-1-propanol 2-amino-1-butanol 2-aminobenzyl alcohol Other primary amines that may be useful are amine functionalized or amine terminated polymers, e.g., hydrogenated nitrile rubber or polyamides.

Preferred reactive compounds for reaction with grafted maleic anhydride are 4-(3-aminopropyl) morpholine and 1-(2-aminoethyl) piperazine.

Still other amides useful in the practice of this invention include amino-aromatic polyamide compounds from the group consisting of:

(a) an N-arylphenylenediamine represented by the formula:

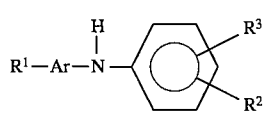

in which Ar is aromatic and R$^1$ is hydrogen: —NH—Aryl, —NH—Arylkyl, a branched or straight chain radical having from 4 to 24 carbon atoms that can be alkyl, alkenyl, alkoxyl, aralkyl, alkaryl, hydroxyalkyl or aminoalkyl, R$^2$ is (NH$_2$, —(NH(CH$_2$)$_n$—)$_m$—NH$_2$, CH$_2$—(CH$_2$)$_n$—NH$_2$, —aryl—NH$_2$, in which n and m has a value from 1 to 10, and R$^3$ is hydrogen, alkyl, alkenyl, alkoxyl, aralkyl, alkaryl having from 4 to 24 carbon atoms, (b) an aminoperimidine represented by the formula:

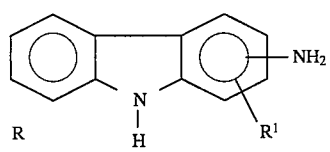

in which R and R$^1$ represent hydrogen or an alkyl, alkenyl, or alkoxyl radical having from 1 to 14 carbon atoms, (c) an aminoindole represented by the formula:

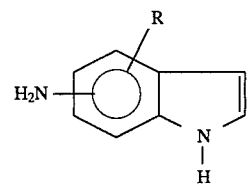

in which R represents hydrogen or an alkyl radical having from 1 to 14 carbon atoms, (d) an amino-indazolinone represented by the formula:

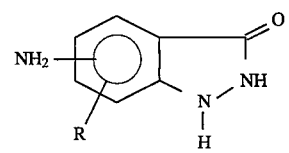

in which R is hydrogen or an alkyl radical having from 1 to 14 carbon atoms, (e) an aminomercaptotriazole represented by the formula:

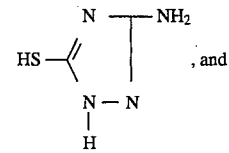

(f) an aminoperimidine represented by the formula:

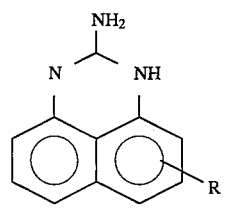

in which R represents hydrogen or an alkyl or alkoxyl radical having from 1 to 14 carbon atoms.

Particularly preferred N-arylphenylenediamines are the N-pnenylphenylenediamines, for example, N-phenyl-1,4-phenylenediamine, N-phenyl-1,3-phenylenediamine, N-phenyl-1,2-phenylenediamine, N-naphthyl-phenylenediamine, N-phenyl-naphthalenediamine and N'-aminopropyl-N-phenylphenylenediamine.

In the preferred embodiment, in which a functional compound is grafted onto a polymer in a first reaction zone and is then subsequently reacted with a reactive compound in a second reaction zone, it has been found that feed of water upstream of the first reaction zone leads to less colored products. The water may be fed into the hopper of the extruder reactor or into that portion of the extruder internal volume not occupied by polymer, in a low pressure section of the screw.

The water is fed to the process despite the fact that the extruder reactor may be preceded by a drying extruder whose purpose is to remove moisture from the feed polymer and reduce it to a low and consistent level of moisture. The drying extruder functions by raising the polymer temperature above the boiling point of water and continuously exposing fresh surfaces of the polymer to promote evaporation of the water vapor into that portion of the extruder internal volume not occupied by polymer. For hydrocarbon polymers of the present invention, the drying process is thermodynamically favorable and needs only the continuous generation of fresh polymer surfaces to provide the appropriate kinetics.

When water is added prior to the first reaction zone of the extruder reactor, as noted above to reduce product color, it enters that portion of the extruder internal volume not occupied by polymer. By considering the way in which the drying extruder functions, as described above, it is readily seen that this added water will not be readily become incorporated into the polymer. There is no thermodynamic driving force for such incorporation and such feed of water does not increase polymer moisture level.

The feed of water to reduce-product color has been found to be particularly advantageous when the functional compound, which is grafted to the polymer in the first reaction zone is a cyclic anhydride, particularly maleic anhydride. In this case, the nature of the reactive compound reacted with the grafted product in the second reaction zone will determine the application for which the product is useful. In some applications, product color will be important and in others it will not. As noted above, some such products of the present invention may be useful as multifunctional viscosity modifiers for automotive lubricating oil. Generally, the color of such a product is not of high importance. Also, as noted above, other such products of the present invention may be useful as components of improved blends of syrene/maleic anhydride copolymers and polypropylene. Since such blends are used in durable and visible consumer products (e.g., refrigerator doors), the color of such a product will be of high importance.

It has further been found that during the course of multiple reaction processes, in which grafting of a cyclic anhydride to a polymer takes place in the first reaction zone, color generation occurs almost exclusively in that first reaction zone. An additional embodiment of the present invention is a process for the production of grafted polymers, particularly cyclic arthydride grafted polymers of improved color, in an extruder reactor by feeding water prior to the grafting reaction zone. In this embodiment of the invention it will be noted that only a single reaction is carried out in the extruder reactor. Such a single reaction may have both theological and chemical aspects as has been previously noted by Steinkamp and Grail in U.S. Pat. No. 3,862,265.

Whether the process is a single reaction process giving a grafted functional product or a multiple reaction process in which the grafted functional product is reacted further with a reactive compound, the feed of water is preferably in the range of 0,001 to 5 percent by weight, more preferably 0.01 to 1 percent by weight, most preferably 0.05 to 0.5 percent by weight of the polymer feed rake.

An aspect of the present invention that is of importance in industry is the economic and environmental benefits of carrying out multiple reactions in a single pass through a single extruder reactor. In general, it is well known that it is often economically advantageous to carry out reactions of polymers in the bulk phase, particularly in an extruder, rather than in solution.

Alternative solution reactions are not economically attractive for the following reasons. Reaction vessels must be large to accommodate the large volumes of solvent which must be used due to the relatively low solubility of polymers and/or the high viscosity of polymer solutions. Overall process residence times are high due to the low dissolution rates and the necessity of recovering the polymer from solution once it has been reacted. The solvent, which is present in much greater quantity than the polymer itself, may compete for the reagent leading to additional costs for wasted reagents. Solvent losses occur, particularly during polymer recovery.

Environmental disadvantages of alternative solution processes center around losses of solvent itself and losses of solvent, which has reacted with the reagent (e.g., halogenated hydrocarbons when a polymer is halogenated).

In contrast, reactions carried our in the bulk phase, particularly in an extruder, are characterized by maximized reaction rates and minimized reactor volumes (due to the absence of a diluent solvent), by absence of side reactions with the solvent and by minimized residence times (due to the absence of dissolution and recovery steps before and after the reaction, respectively).

In the present multiple reaction extruder process, these economic benefits are received multiply. Additionally, the purification of the polymer after each reaction and prior to the next reaction, which is an important aspect of the present invention also serves to minimize the environmental debits of the process by maximizing the purity of the product at each stage of the process.

Another advantage of the present process is that it permits the preparation of pelletized multifunctional viscosity modifiers for lubricating oils. Most multifunctional viscosity modifiers are prepared in oil solutions and are sold and transported as such. This significantly increases the cost of transporting such materials. In addition intensive mixing is required to get the initial polymer backbone into solution. The pellets produced by the current process can be easily shipped in bulk without the required oil solution. The pellets also dissolve lubricating oil quite readily requiring less mixing than present blending processes.

The preferred multiviscosity modifier of the present invention is prepared from two ethylene-propylene copolymer backbones, one having a relatively low ethylene content (<50 wt. % ethylene) and the other a relatively high ethylene content (>60 wt. %). Most preferred are low ethylene copolymers having an ethylene content of about 44 wt % and high ethylene copolymer having an ethylene content of about 70 wt. %. The viscosity modifier will comprise about 100 to 30 wt. % high ethylene copolymer mixed with 0 to 70 wt. % low ethylene copolymer with 55 wt. % high ethylene copolymer and 45 wt. % low ethylene copolymer most preferred.

The two component multifunctional viscosity modifiers described above can be prepared in several ways. The functional groups can be grafted to each of the copolymers separately and then the functionalized copolymers can then be mechanically blended. In the preferred method for practicing the invention, the two copolymers are simultaneously fed into the extruder reactor and are functionalized and blended an the same time.

The above recitation of typical reactions and polymers are merely illustrative and are not intended to limit the scope of the invention. Additional reactions which can be used in the process of the invention will be readily apparent to those skilled in the art.

As discussed above, one of the possible uses of the invention is the production of nitrogen containing graft polymers which are useful as multifunctional viscosity modifiers for lubricating oils. A minor amount, e.g. 0.01 up to 49 wt %, preferably 0.05 to 25 wt. %, based on the weight of the total composition, of the multifunctions viscosity modifiers produced in accordance with this invention can be incorporated into a major amount of an oleaginous material, such as a lubricating oil or hydracarbon fuel, depending upon whether one is forming finished products or additive concentrates. When used in lubricating oil compositions, e.g. automotive or diesel crankcase lubricating oil, derivatized copolymer concentrations are usually within the range of about 0.01 to 25 wt %, of the total composition. The lubricating oils to which the products of this invention can be added include not only hydrocarbon oil derived from petroleum, but also include synthetic lubricating oils such as esters of dibasic acids; complex esters made by esterfications of monobasic acids, polyglycols, dibasic acids and alcohols; polyalphaolefin oils, etc.

The nitrogen-containing graft polymers of the invention may be utilized in a concentrate form, e.g., from about 1 wt. % up to about 50 wt. %, preferably 3 to 25 wt. %, in oil, e.g., mineral lubricating oil, for ease of handling, and may be prepared in this form by dissolving the reaction product of the invention in a suitable oil. Alternatively, the polymers can be pelletized as discussed above.

The above oil compositions may optionally contain other conventional additives such as pour point depressants, anti-wear agents, antioxidants, other viscosity-index improvers, dispersants, corrosion inhibitors, antifoaming agents, detergents, rust inhibitors, friction modifiers, and the like.

Corrosion inhibitors, also known as anti-corrosive agents, reduce the degradation of the metallic parts contacted by the lubricating oil composition. Illustrative of corrosion inhibitors are phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of carbon dioxide. Phosphosulfurized hydrocarbons are prepared by reacting a suitable hydrocarbon such as a terpene, a heavy petroleum fraction of a $C_2$ to $C_6$ olefin polymer such a polyisobutylene, with from 5 to 30 wt. % of a sulfide of phosphorus of ½ to 15 hours, at a temperature in the range of about 66° to about 316° C.

Oxidation inhibitors, or antioxidants, reduce the tendency of mineral oils to deteriorate in service which deterioration can be evidenced by the products of oxidation such as sludge and varnish-like deposits on the metal surfaces, and by viscosity growth. Such oxidation inhibitors include alkaline earth metal salts of alkyl-phenolthioesters having preferably $C_5$ to $C_{12}$ alkyl side chains, e.g., calcium nonylphenol sulfide, barium octylphenyl sulfide, dioctylphenylamine, phenylalphanaphthylamine, phospho-sulfurized or sulfurized hydrocarbons, etc.

Other oxidation inhibitors or antioxidants useful in this invention comprise oil-soluble copper compounds. The copper may be blended into the oil as any suitable oil soluble copper compound- By oil soluble it is meant that the compound is oil soluble under normal blending conditions in the oil or additive package. The copper compound may be in the cuprous or cupric form. The copper may be in the form of the copper dihydrocarbyl thio- or dithio-phosphates. Alternatively, the copper may be added as the copper salt of a synthetic or natural carboxylic acid. Examples of same include $C_{10}$ to $C_{18}$ fatty acids, such as stearic or palmitic acid, but unsaturated acids such as oleic or branched carboxylic acids such as naphthenic acids of molecular weights of from about 200 to 500, or synthetic carboxylic acids, are preferred, because of the improved handling and solubility properties of the resulting copper carboxylates. Also useful are oil-soluble copper dithiocarbamates of the general formula $(RR,NCSS)nCu$ (where n is 1 or 2 and R and R, are the same or different hydrocarbyl radicals containing from 1 to 18, and preferably 2 to 12, carbon atoms, and including radicals such as alkyl, alkenyl, aryl, aralkyl, alkaryl and cycloaliphatic radicals. Particularly preferred as R and R, groups are alkyl groups of from 2 to 8 carbon atoms, Thus, the radicals may, for example, be ethyl, n-propyl, i-propyl, n-butyl, i-butyl, sec-butyl, amyl, n-hexyl, i-hexyl, n-hepty, n-octyl, decyl, dodecyl, octadecyl, 2-ethylhexyl, phenyl, butylphenyl, cyclohexyl, methylcyclopentyl, propenyl, butenyl, etc. In order to obtain oil solubility, the total number of carbon atoms (i.e., R and R,) will generally be about 5 or greater. Copper sulphonates, phenates, and acetylacetonates may also be used.

Exemplary of useful copper compounds are copper CuI and /or CuII salts of alkenyl succinic acids or anhydrides. The salts themselves may be basic, neutral or acidic. They may be formed by reacting (a) polyalkylene succinimides (having polymer groups of Mn of 700 to 5,000) derived from polyalkylene-polyamines, which have at least one free carboxylic acid group, with (b) a reactive metal compound. Suitable reactive metal compounds include those such as cuprio or cuprous hydroxides, oxides, acetates, borates, and carbonates or basic copper carbonate.

Examples of these metal salts are Cu salts of polyisobutenyl succinic anhydride, and Cu salts of polyisobutenyl succinic acid. Preferably, the selected metal employed is its divalent form, e.g., Cu+2. The preferred substrates are polyalkenyl succinic acids in which the alkenyl group has a molecular weight greater than about 700. The alkenyl group desirably has a Mn from about 900 to 1,400, and up to 2,500, with a Mn of about 950 being most preferred. Especially preferred is polyisobutylene succinic anhydride or acid. These materials may desirably be dissolved in a solvent, such as a mineral oil, and heated in the presence of a water solution (or slurry) of the metal bearing material. Heating may take place between 70, and about 200° C. Temperatures of 110° C. to 140° C. are entirely adequate. It may be necessary, depending upon the salt produced, not to allow the reaction to remain at a temperature above about 140° C. for an extended period of time, e.g., longer than 5 hours, or decomposition of the salt may occur.

The copper antioxidants ( e.g., Cu-polyisobutenyl succinic anhydride, Cu-oleate, or mixtures thereof) will be generally employed in an amount of from about 50 to 500 ppm by weight of the metal, in the final lubricating or fuel composition.

Friction modifiers serve to impart the proper friction characteristics to lubricating oil compositions such as automatic transmission fluids.

Representative examples of suitable friction modifiers are found in U.S. Pat. No. 3,933,659 which discloses fatty acid esters and amides; U.S. Pat. No. 4,176,074 which describes molybdenum complexes of polyisobutyenyl succinic anhydride-amino alkanols; U.S. Pat. No. 4,105,571 which discloses glycerol esters of dimerized fatty acids; U.S. Pat. No. 3,779,928 which discloses alkane phosphonic acid salts; U.S. Pat. No. 3,778,375 which discloses reaction products of a phosphonate with an oleamide: U.S. Pat. No. 3,852,205 which discloses S-carboxyalkylene hydrocarbyl succinimide, S-carnoxyalkylene hydrocarbyl succinamic acid and mixtures thereof: U.S. Pat. No. 3,879,306 which discloses N(hydroxyalkyl)alkenyl-succinamic acids or succinimides; U.S. Pat. No. 3,932,290 which discloses reaction products of di-(lower alkyl) phosphites and expoxides; and U.S. Pat. No. 4,028,258 which discloses the alkylene oxide adduct of phosphosulfurized N-(hydroxyalkyl)alkenyl succinimides. The disclosures of the above references are herein incorporated by reference. The most preferred friction modifiers are succinate esters, or metal salts thereof, of hydrocarbyl substituted succinic acids or anhydrides and thiobis-alkanols such as described in U.S. Pat. No. 4,344,853.

Dispersants maintain oil insolubles, resulting from oxidation during use, in suspension in the fluid thus preventing sludge flocculation and precipitation or deposition on metal parts. Suitable dispersants include high molecular weight alkyl succinimides, the reaction product of oil-soluble polyisobutylene succinic anhydride with ethylene amines such as tetraethylene pentamine and borated salts thereof.

Pour point depressants, otherwise known as lube oil flow improvers, lower the temperature at which the fluid will flow or can be poured. Such additives are well known. Typical of those additives which usefully optimize the low temperature fluidity of the fluid are $C_6$–$C_{18}$ dialkylfumarate vinyl acetate copolymers, polymethacrylates, and wax naphthalene. Foam control can be provided by an antifoamant of the polysiloxane type, e.g., silicone oil and polydimethyl siloxane.

Anti-wear agents, as their name implies, reduce wear of metal parts. Representative of conventional antiwear agents are zinc dialkyldithiophosphate and zinc diaryldithiosphate.

Detergents and metal rust inhibitors include the metal salts of sulphonic acids, alkyl phenols, sulfurized alkyl phenols, alkyl salicylates, naphthenates and other oil soluble mono- and di-carboxylic acids. Highly basic (viz, overbased) metal salts, such as highly basic alkaline earth metal sulfonates (especially Ca and Mg salts) are frequently used as detergents. Representative examples of such materials, and their methods of preparation, are found in co-pending Ser. No. 754,001, filed Jul. 11, 1985, the disclosure of which is hereby incorporated by reference.

Some of these numerous additives can provide a multiplicity of effects, e.g., a dispersant-oxidation inhibitor. This approach is well known and need not be further elaborated herein.

Compositions when containing these conventional additives are typically blended into the base oil in amounts which are effective to provide their normal attendant function. Representative effective amounts of such additives are illustrated as follows:

| Additive | Wt. % a.i. (Broad) | Wt. % a.i. (Preferred) |
| --- | --- | --- |
| Viscosity Modifier | .01–12 | .01–4 |
| Corrosion Inhibitor | 0.01–5 | .01–1.5 |
| Oxidation Inhibitor | 0.01–5 | .01–1.5 |
| Dispersant | 0.1–20 | 0.1–10 |
| Pour Point Depressant | 0.01–5 | .01–1.5 |
| Anti-Foaming Agents | 0.001–3 | .001–2.0 |
| Anti-Wear Agents | 0.001–5 | .001–1.5 |
| Friction Modifiers | 0.01–5 | .01–1.5 |
| Detergents/Rust Inhibitors | .01–10 | .01–3 |
| Mineral Oil Base | Balance | Balance |

All of said weight percents expressed herein are based on active ingredient (a.i.) content of the additive, and/or upon the total weight of any additive-package, or formulation which will be the suan of the a.i. weight of each additive plus the weight of total oil or diluent.

The imide grafted ethylene copolymers of this invention find their primary utility in lubricating oil compositions, which employ a base oil in which these copolymers are dissolved or dispersed.

Thus, base oils suitable for use in preparing the lubricating compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the additives of the present invention in base oils conventionally employed in and/or adapted for use as power transmitting fluids such as automatic transmission fluids, heavy duty hydraulic fluids, power steering fluids and the like. Gear lubricants, industrial oils, pump oils and other lubricating oil compositions can also benefit from the incorporation therein of the additives of the present invention.

Thus, the additives of the present invention may be suitably incorporated into synthetic base oils such as alkyl esters of dicarboxylic acids, polyglycols and alcohols; poly-alpha-olefins, polybutenes, alkyl benzenes, organic esters of phosphoric acids, polysilicone oils, etc.

The imide grafted ethylene copolymers are oil-soluble, dissolvable in oil with the aid of a suitable solvent, or are stably dispersible materials. Oil-soluble, dissolvable, or stably dispersible as that terminology is used herein does not necessarily indicate that the materials are soluble, dissolvable, miscible, or capable of being suspended in oil in all proportions. It does mean, however, that the additives, for instance, are soluble or stably dispersible in oil to an extent sufficient to exert their intended effect in the environment in which the oil is employed. Moreover, the additional incorporation of other additives may also permit incorporation of higher levels of a particular copolymer hereof, if desired.

Accordingly, while any effective amount, i.e., dispersant or viscosity index improving-dispersant effective amount, of the additives of the present invention can be incorporated into the fully formulated lubricating oil composition, it is contemplated that such effective amount be sufficient to provide said lube oil composition with an amount of the additive of typically from about 0.01 to about 10, preferably 0.1 to 6.0, and more preferably from 0.25 to 3.0 wt. %, based on the weight of said composition.

The following Examples I to XV illustrate a useful embodiment of the present invention, in which grafting of a polyolefin with maleic anhydride, initiated by thermal decomposition of peroxide is carried out in the first reaction zone. This is followed by imidization of the grafted anhydride with a primary amine in the second reaction zone.

For the reaction of the polyolefin with maleic anhydride, LUPERSOL® 130 from Atochem North America is used as the initiator. It contains 90 to 95 percent by weight of 2,5-dimethyl-2,5-di(t-butylperoxy) hexyne-3 as the active ingredient.

The following rubbery ethylene-propylene copolymers are used as the polyolefin:

ETHYLENE-PROPYLENE COPOLYMER. A:

70 weight percent ethylene, melt flow rate=12 grams/10 minutes, measured with a load of 2.16 kg at 230° C., Mooney viscosity, ML, 1+4, 125° C.=18, manufactured by Exxon Chemical Company, USA, as MDV 90-9.

ETHYLENE-PROPYLENE COPOLYMER B:

43 weight percent ethylene, melt flow rate=14 grams/10 minutes, measured with a load of 10.0 kg at 230° C., Mooney viscosity, ML, 1+4, 125° C.=28, sold by Exxon Chemical Company, USA as VISTALON® 457.

The following primary amines are used:

AMINE A: 4-(3-aminopropyl)morpholine, purchased from Texaco Chemical Company.

AMINE B: 1-(2-aminoethyl)piperazine, purchased from Union Carbide Chemicals and Plastics Company, Inc.

AMINE A contains one primary amine functional group and one tertiary amine functional group. When an imide is formed by reaction of the primary amine with grafted maleic anhydride, it will be evident to those skilled in the art that tertiary amine functionality is introduced into the polymer. By virtue of its reaction to form an imide, the basicity of the primary amine group is lost, but the tertiary amine, of course, remains basic and will react as a base, as for example with acids. For this reason the product imide, which is a polymer exhibiting the properties of a base, is useful in automotive lubricating oils. In this application the tertiary amine is thought to react with acidic species generated by oxidation of the oil during use and that by doing so, it reduces the precipitation of sludge in the oil and the deposition of varnish on automotive engine parts, thereby contributing to desirable reduction of engine part wear. The polymeric nature of the imide also contributes to desirable modification of the viscosity of the lubricating oil. This type of product is generally referred to as a multifunctional viscosity modifier, recognizing that it performs more than one function when used as an automotive lubricating oil additive.

By reaction with AMINE A or similar amines, both POLYOLEFIN A and POLYOLEFIN B give products useful as multifunctional viscosity modifiers- Those made from POLYOLEFIN B have different formulated oil low temperature properties. This is a consequence of the lower degree of crystallinity of POLYOLEFIN B, which in turn results from the rough equivalence of the molar contents of ethylene and propylene and consequent minimum in crystallinity for an ethylene-propylene random copolymer.

AMINE B contains one each of primary, secondary and tertiary amine groups. When an imide is formed by reaction of the primary amine with grafted maleic anhydride, it will be evident to those skilled in the art that both secondary and tertiary amine functionality are introduced into the polymer. By virtue of its reaction to form an imide, the basicity of the primary amine group is lost, but the secondary and tertiary amines, of course, retain their basic characters. For this reason this product imide, which is a polymer exhibiting the properties of a base, may also be useful in automotive lubricating oils. However, in contrast with imide polymers made with AMINE A or similar amines containing no secondary amine functionality, it has been found that this product imide may relatively easily undergo thermal crosslinking. For example, at 230° C., one of the usual temperatures for measurement of the melt flow rate of elastomers, such imides may become crosslinked during the standard conditioning period of the melt flow rate test and cannot be extruded through the instrument orifice. This is not true for imides derived from amines, such as AMINE A, which do not contain secondary amine functionality. This difference is interpreted as indicating that the secondary amine group can react, at sufficiently high temperatures, with an imide linkage in another molecule. This may limit the utility of such imides as multifunctional viscosity modifiers, but has suggested other uses. The application of imides derived from an amine having one primary amine and at least one secondary amine group, such as AMINE B, for toughening of polymer blends containing styrene maleic anhydride copolymers is described in a copending application, U.S. application Ser. No. 733,561, filed Jul. 22, 1991.

Prior to passage through the extruder-reactor, the rubbery ethylene-propylene copolymer feed was first dried to a low and consistent level of moisture by passage through a drying extruder. The drying extruder is a 3½ inch single screw machine with an overall length to diameter ratio of (L/D) of 24. The dried rubbery ethylene-propylene copolymer exits the drying extruder at a temperature of about 200° C. and flows directly into the feed zone of the extruder-reactor.

The extruder reactor is a two (2) inch diameter counter-rotating non-intermeshing twin screw extruder. Its length is varied by the addition or removal of barrel sections.

Figure 2:
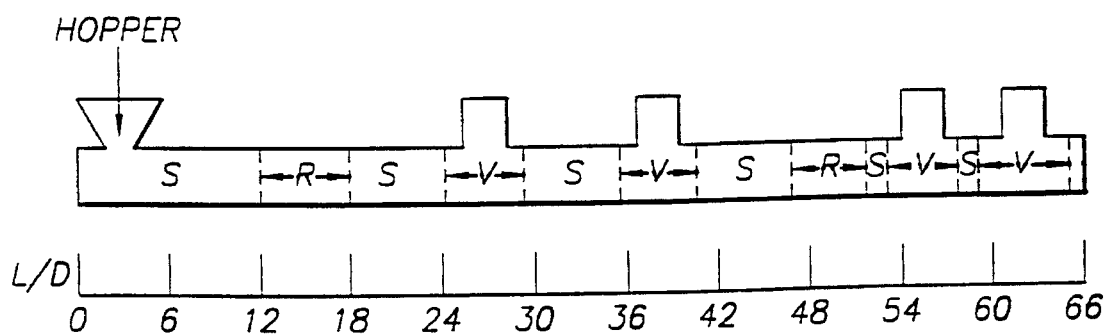
FIG. 2 is a schematic drawing of the extruder-reactor used for examples V through VII, XI through XII, XIII, and XVII.
Figure 3:
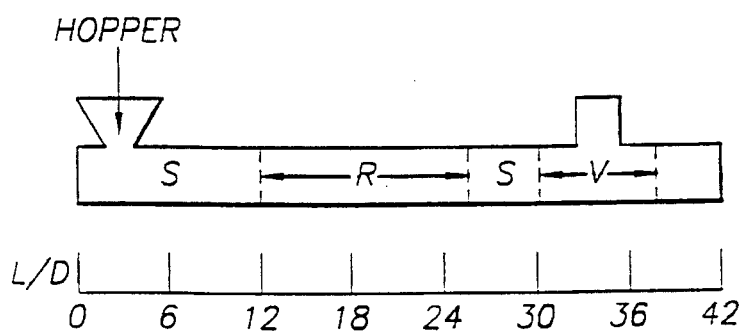
FIG. 3 is a schematic drawing of the extruder-reactor used for example XVIII.

Examples I to IV below were carried out with an L/D of 54 and a two vent configuration as shown in FIG. 1 or with an L/D of 66 and a four vent configuration as shown in FIG. 2. Only Example XVIII was carried out with L/D of 42 and a single vent configuration as shown in FIG. 3. In all cases, a single barrel extension with a L/D of 6 was attached at the end of the extruder. This serves to generate pressure to force the product through the extruder die. After exiting the die, the product passes through an underwater pelletizer. The pelletizer is followed by a spin dryer and finally a pellet collection drum.

A key feature of the invention is the compartmentalization of the extruder by means of restrictive screw elements, designated as "S" in FIGS. 1 and 2, which form polymer seals when polymer is flowing through the extruder. In addition to the polymer seals indicated in the Figures, a final seal is formed at the end of the extruder by the single barreled extension and subsequent die. In the compartments generated by these seals, suitable screw elements are present to create reaction zones, denoted as "R" in FIGS. 1 to 3 or vents denoted as "V" in the Figures.

Designation of a section of the screw as a reaction zone means that it contains screw elements suitable for bringing about the desired reactions. It need not necessarily be used as a reaction zone and in some of the comparative examples below this will be seen to be the case. Generally, in carrying out the present invention, zones so designated will be used as reaction zones. Similarly, vents are zones which contain screw elements suitable for venting and will generally, but not necessarily, be used for this purpose.

Each vent is connected to a vacuum system to reduce pressure and assist stripping of unreacted reagents, peroxide decomposition products, and other volatile impurities. Stripping is further assisted by injection of nitrogen just downstream of the vent to provide a flow counter current to that of the polymer.

The extruder barrel has cores through which water for cooling or steam for heating may be circulated to control barrel temperature.

In addition to the required maleic anhydride, peroxide and amine feeds, water may optionally be fed, at low rates, upstream of the first reaction zone. This leads to products with improved ( i.e. lighter) color.

The optional water feed may be made by injection into the feed hopper of the extruder-reactor.

EXAMPLE I

In this example and Example II, experiments were conducted to study the behavior of the extruder-reactor in the configuration shown in FIG. 1. The purpose was to determine whether or not the use of a single vent at the end of the first reaction zone would remove sufficient unreacted maleic anhydride to permit imidization to proceed in the second reaction zone.

The ethylene-propylene copolymer A was fed from the drying extruder to the hopper of the extruder-reactor at a rate of 100 kg/h. Liquified maleic anhydride was fed into the extruder-reactor at a rate of 3.35 kg/h through an injection valve at about L/D=7. LUPERSOL® 130 was fed into the extruder-reactor at a rate of 125 g/h through an injection port at about L/D=17. The LUPERSOL® 130 was fed as a 50 wt. % solution in ISOPAR® V mineral oil. Pressure in the vents was maintained at about 100 kPa below atmospheric pressure. Stripping was further assisted by the injection of nitrogen at a rate of 1.5 kg/h at about L/D=30 and L/D=46.

Temperature in the barrel was kept at between 295 and 305° C. The extruder screw speed was 300 rpm.

Samples of the pelletized product were taken every ten minutes and were examined by infrared spectroscopy, using thin (about 0.11 mm) films made in a hydraulic press (500 psi, 130° to 150° C., 6 seconds). The films showed infrared bands at 1790 and 1715 $cm^{-1}$, attributed to grafted maleic anhydride and maleic acid respectively. Using the absorbance of these two bands, the absorbance of the copolymer band at about 720 $cm^{-1}$ and a series of standards prepared from dodecenylsuccinic anhydride and copolymer A, the grafted maleic anhydride and maleic acid contents of the product were estimated. The mean values for four samples were—maleic anhydride =0,124 mmole/gram; maleic acid= 0.014 mmole/gram.

Unreacted maleic anhydride was then measured by storing the film samples in air at room temperature for 18 hours. The volatile maleic anhydride evaporates under these conditions. Remeasurement of the film shows decrease values for maleic anhydride. For the present examples, a value of 0,001 mmole/gram of free maleic anhydride was measured, the lowest amount detectable. While this amount of maleic anhydride would be acceptable, it should be noted that the polymer passed through two vent zones with no subsequent reaction taking place before it reached the final vent. As shown in the next example, when only one vent is used to remove the maleic anhydride before the imidization reaction takes place, a different result is achieved.

While this is not an example of the present invention, it does demonstrate the effectiveness of the dual vent system for removing volatile impurities.

EXAMPLE II

This experiment was carried out under the same conditions as Example I with the exception that an excess of Amine A, specifically 4-(3-aminopropyl)morpholine, was fed into the extruder-reactor (as shown in FIG. 1) through an injection port just after the first vent at L/D=32.

Samples of the pelletized products were taken every ten minutes and were analyzed as before. They showed an infrared band at about 1705 $cm^{-1}$, attributed to the maleimide formed. Using the absorbance of this band ratioed with the absorbance of the copolymer band at at about 720 $cm^{-1}$ and a series of standards whose imide content was determined by nitrogen analysis, the imide content, based on an average of four samples was found to be 0.187 mmole/gram.

The discrepancy between the imide content of the product of this example (0.187 mmole/gram) and the total grafted maleic anhydride and maleic acid content (0.139) of the product of Example I is due to the fact that after the polymer has passed through the first vent zone, there is still a significant amount of unreacted maleic anhydride present in the polymer. In Example 1, this unreacted maleic anhydride is removed by the second vent. In Example II, the amine introduced before the excess anhydride is removed and the amine reacts with the anhydride to form a free imide (i.e., not bound to the polymer) which is not removed by the second vent.

It is estimated that the imide product contains about 0.049 (0.187–0.139) mmole/g of the reaction product of the amine with free maleic anhydride. It is believed that this product is polymeric (the monomeric imide contains, within the same molecule, a double bond susceptible to anionic polymerization and, in the tertiary amine functionality, an initiator for anionic polymerization) and cannot be easily removed by venting. The maleic anhydride charged was 0.342 mmole/g and therefore the unreacted anhydride after the first vent zone calculated as 0.203 (0.342–0.139) mmole/g. The efficiency of the first vent zone in removing unreacted maleic anhydride is estimated at 76% [100*(0.203–0.049)/0.203]. This is in the range of efficiency (20 to 0%) disclosed by Gorman in European Application 0 422 728. However, it is more appropriate to judge the process by the estimated product purity. In this case it is estimated at 74% [100*0.139/0.187]. This is not considered high enough to make the configuration of the extruder as shown in FIG. 1 attractive for the present purpose.

EXAMPLE III

In this example, the teaching of the prior art were used to prepare an imidized ethylene-propylene copolymer, suitable for use as a multifunctional viscosity modifier by first maleating the copolymer in an extruder reactor and then imidizing the maleated copolymer in solution.

The ethylene-propylene copolymer A was fed from a drying extruder to the hopper of the extruder-reactor, configured as shown in FIG. 1, at a rate of 100 kg/hr. Liquified maleic anhydride was fed at a rate of 1.71 kg/hr through an injection valve at about L/D=7 and LUPERSOL® 130 was fed at a rate of 125 g/hr through an injection valve at about L/D=17. The LUPERSOL® 130 was fed as a 50 wt. % solution of ISOPAR® V mineral oil. The pressure in the vents was maintained at about 50 kPa below atmospheric pressure. Stripping was further assisted by injection of nitrogen at the rate of 1.0 kg/hr at about L/D=30 and L/D=46. Temperature within the barrel was maintained at between 295 and 305° C. The extruder screw speed was 300 ppm.

Samples of the pelletized product were taken every ten minutes and were analyzed as described in Example I to determine the amounts of maleic anhydride and maleic acid present. The mean values for six samples were—maleic anhydride: 0.105 mmole/gram: maleic acid:0.015 mmole/gram. The average melt flow rate of the same six product samples was 30.4 grams/10 minutes as measured with a 2.16 kg weight at 230° C.

The change in melt flow rate of the maleated product from the starting polymer indicates a simultaneous theological and chemical change. This was also noted in U.S. Pat. No. 3,862,265 and are regarded as dual manifestations of a single chemical reaction.

The imidization of the maleated copolymer with Amine A, 4-(3-aminopropyl)morpholine was then carried out in solution. A 20 wt. % solution of the maleated copolymer in a solvent extracted 100N mineral oil was prepared and heated to 17520 C. under a nitrogen atmosphere. An excess of Amine A (2.5 moles per mole of grafted anhydride plus acid) was added and the solution stirred at 175° C. for 30 minutes. The solution was sparged with nitrogen for a further 30 minutes to remove unreacted amine. The stripped solution was then used to prepare oil for the engine tests described below in Example VIII.

EXAMPLE IV

In this experiment, an imidized ethylen-epropylene copolymer was prepared by conducting a maleation reaction during a first pass through the extruder-reactor, configured as shown in FIG. 1, and then conducting the imidization during a second pass through the reactor.

The maleation of the copolymer A was conducted in the same manner as Example III except that water was fed into the reactor at the hopper at a rate of 100 g/hr. Samples of the maleated copolymer were taken and analyzed to determine the amount of grafted maleic anhydride and maleic acid as described in Example I. The mean values for six samples were as follows—maleic anhydride:0.122 mmole/gram: maleic acid:0.016 mmole/gram. The average melt flow for the same six samples was 27.9 grams/10 minutes as measured with a 2.16 kg weight at 230° C.

The maleated copolymer was then reacted with 4(3-aminopropyl)morpholine in a second pass through the extruder-reactor as follows. The maleated copolymer was fed into the hopper of an extruder-reactor configured in the manner shown in FIG. 1, at a rate of 100 kg/hr. The amine, 4-(3-aminopropyl)morpholine was fed at a rate of 4.2 kg/hr through an injection valve at about L/D=33. The pressure in the vents was maintained at about 50 kPa below atmospheric pressure. Stripping was further assisted by the injection of nitrogen at a rate of 1 kg/hr at about L/D=30 and L/D=46. Temperature in the barrel was maintained at between 295 and 305° C. The extruder screw speed was 300 rpm.

Samples of the pelletized product were taken every ten minutes and were examined by infrared spectroscopy in the manner described in Example II. The imide content of the product, based on an average of three samples was 0.143 mole/gram. The average melt flow rate for the same three product samples was 37.4 grams/10 minutes as measured with a 2.16 kg weight at 230° C. The measured imide content is not significantly different than the sum of the maleic anhydride content and the maleic acid content.

The imidized copolymer was then evaluated as a multifunctional viscosity modifier as described below.

EXAMPLE V

Following the process of the invention, ethylene-propylene copolymer was maleated and then imidized in a single reactor-extruder to prepare a multifunctional viscosity modifier.

The ethylene-propylene copolymer A was fed from a drying extruder into the hopper of an extruder-reactor configured as shown in FIG. 2 at a rate of 100 kg/hr. Water was also fed into the hopper at a rate of 100 g/hr. Liquified maleic anhydride was fed into the reactor at a rate of 1.65 kg/hr through an injection valve at about L/D=7. LUPERSOL® 130 was fed at a rate of 125 g/hr through an injection valve at about L/D=17. The LUPERSOL® 130 was fed as a 50 wt. % solution in ISOPAR® V mineral oil. Amine A 4-(3-aminopropyl)morpholine was fed into the second reactor zone at a rate of 3.8 kg/hr at about L/D=46.

The pressures in the four vents were Vent 1: 95 kPa; Vent 2: 75 kPa; Vent 3: 65 kPa and Vent 4: 65 kPa below atmospheric pressure. Stripping was further assisted by injection of nitrogen at a rate of 1 kg/hr at L/D=32, 40, 58 and 64. Temperature within the barrel was maintained at between 295° and 305° C.

Samples of the pelletized product were taken every ten minutes and were examined by infrared spectroscopy as described in Example II. The imide content of the product, based on an average of three samples was 0.134 mole/gram. The average melt flow of the same three samples was 28.4 gm/10 minutes as measured with a 2.16 kg weight at 230° C.

The imide product was then evaluated as a multifunctional viscosity modifier as described below in Examples VIII and IX.

EXAMPLE VI

In order to gauge the usefulness of the extruder, configured as shown in FIG. 2, for maleation followed by imidization, Example V was repeated except that the amine A was not fed.

A product containing grafted maleic anhydride: 0.120 mmole/g and maleic acid 0.015 mmole/g was obtained. The total, 0.135 mmole/g, is within experimental error identical to the quantity of imide (0.134 mmole/g) found in the product of Example V. If the calculation of product purity, shown in Example II, is repeated here a product purity value slightly in excess of theoretical is obtained. It is concluded that, within experimental error, which may be as much as 5%, the imide product purity of the product of Example V is 100%. In comparison, the similar calculation for the extruder configured as shown in FIG. 1, as indicated in Example II, is only 74%. It is easily seen that FIG. 2 represents a useful configuration for carrying out maleation followed by imidization, while FIG. 1 does not.=

EXAMPLE VII

This example was carried out in the same manner as Example V except that water was not fed into the hopper. The product was analyzed as discussed above and was found to have an imide content of 0,127 mmole/gram and a melt flow rate of 18.9 grams/10 minutes.

The product was evaluated as a multifunctional viscosity modifier as described below in Examples IX and X.

EXAMPLE VIII

Samples of the products prepared in Examples III, IV, and V were evaluated as multifunctional viscosity modifiers as follows.

SAE 10W-40 lubricating oil formulations of API SG quality were prepared using samples of the products from Examples III, IV and V. The oils were then used in a shortened (120 hour vs 480 hour) version of the Caterpillar 1G-2 engine test which is an industry and government accepted test for the dispersancy and overall effectiveness of diesel engine lubricating oils. The Caterpillar IG-2 test is also Federal Test Method 791-341. The results were compared with the performance of an equivalent motor oil containing a commercial multifunctional viscosity modifier ECA 8899, manufactured by Exxon Chemical Company.

| MFVM in Formulation | TGF[1] | WTD[2] |
|---|---|---|
| ECA 8899 | 73 | 288 |
| III | 88 | 376 |
| IV | 76 | 287 |
| V | 67 | 143 |

[1]TGF = Top Groove Fill, which is % deposits in top piston groove.
[2]WTD = Weighted Total Demerits.

WTD is a cumulative rating based on observation of deposits in the groove and land areas of the piston and lacquer on piston skirts with all these specific evaluations being weighted according to their relative importance and the final WTD value being calculated in accordance with the test procedure. As noted, both TGF and WTD were determined after 120 hours. Lower values of both TGF and WTD are indicative of better performance.

From the above data it can be seen that only Example V, the viscosity modifier prepared by the process of the invention meets, and in fact, exceeds the performance of a commercial multifunctional viscosity modifier.

EXAMPLE IX

The multifunctional viscosity modifier of Example V was next used in a shortened (120 hour vs. 480 hour) version of the Caterpillar 1H-2 engine test. SAE 10W-40 lubricating oil formulations of API SG quality were tested using the following multifunctional viscosity modifiers:

| MFVM in Formulation | TGF | WTD |
|---|---|---|
| Example V | 32 | 82 |
| Example VII | 31 | 52 |

The caterpillar 1H-2 test is an industry and government accepted test for the dispersancy and overall effectiveness of diesel lubricating oils. Caterpillar Test 1H-2 is also U.S. Federal Test Method 791-346 and ASTM Method 509A.

As noted above, both TGF and WTD were determined after 120 hours. WTD is a cumulative rating based on observation of deposits in the groove and land areas in the piston and lacquer on piston skirts with all these specific evaluations being weighted according to their relative importance and the final WTD value being calculated in accordance with the test procedure. Lower values of both TGF and WTD are indicative of better performance.

EXAMPLE X

A sample of the product made in Example V was used to prepare a 15W-40, API CD quality motor oil. The oil was then used in a Caterpiller 1K engine test. The Caterpillar 1K measures piston deposits and top groove fill (TGF) as does the 1G2 test but, it places more emphasis on crown deposits, oil consumption, piston underside lacquer and piston skirt lacquer. It is significantly more severe than the caterpillar 1G2 test.

The results of the test are as follows:

| MFVM in Formulation | TGF | WTD |
|---|---|---|
| ECA 8899 | 10 | 400 |
| Example VII | 41 | 285 |

As seen from Examples VIII to X oils containing multifunctional viscosity modifiers made in accordance with this invention consistently outperform oils containing commercial viscosity modifiers as well as those containing viscosity modifiers prepared by processes taught or suggested by the prior art.

EXAMPLE XI

Following the process of the invention, ethylene-propylene copolymer was maleated and then imidized in a s ingle reactor-extruder, configured as shown in FIG. 2, to prepare a multifunctional viscosity modifier.

The ethylene-propylene copolymer B was fed from a drying extruder into the hopper of an extruder-reactor configured as shown in FIG. 2 at a rate of 100 kg/hr.

Water was also fed into the hopper at a race of 100 g/hr. Liquified maleic anhydride was fed into the reactor at a rate of 1.95 kg/hr through an injection valve at about L/D=7. LUPERSOL® 130 was fed at a rate of 80 g/hr through an injection valve at about L/D=17. The LUPERSOL® 130 was fed as a 50 wt. % solution in ISOPAR® V mineral oil. Amine, 4-(3-aminopropyl)morpholine was fed into the second reactor zone at a rate of 3.9 kg/hr at about L/D=46.

The pressures in the four vent zones were Vent 1: 90 kPa: Vent 2: 85 kPa: Vent 3: 80 kPa and Zone 4: 70 kPa below atmospheric pressure. Stripping was further assisted by injection of nitrogen at a race of 1 kg/hr at L/D=32, 40, 58 and 64. Temperature within the barrel was maintained at between 240° and 295° C.

Samples of the pelletized produce were taken every ten minutes and were examined by infrared spectroscopy as described in Example II. The imide content of the product, based on an average of thirty samples was 0.122 mmole/gram. The average melts flow of the same three samples was 108 gm/10 minutes as measured with a 2.16 kg weight at 230° C.

EXAMPLE XII

In this comparative example, a maleic anhydride grafted polyolefin was prepared in order to provide a bas is for evaluating the process described in Example XIII.

The ethylene-propylene copolymer B was fed from a drying extruder into the hopper of an extruder-reactor configured as shown in FIG. 2 at a rate of 60 kg/hr. Water was also fed into the hopper at a rate of 100 g/hr. Liquified maleic anhydride was fed into the reactor at a rate of 0.8 kg/hr through an injection valve at about L/D=7. LUPERSOL® 130 was fed at a rate of 30 g/hr through an injection valve at about L/D=10. The LUPERSOL® 130 was fed as a 20 wt. % solution in ISOPAR® V mineral oil.

The pressures in the four vents were about 70 to 80 kPa below atmospheric pressure. Stripping was further assisted by injection of nitrogen at a rate of 1 kg/hr at L/D=32, 40, 58 and 64. Temperature within the barrel was maintained at between 295° and 305° C.

Samples of the pelletized product were taken every ten minutes and were examined by infrared spectroscopy at described in Example I.

Based on an average of three samples, the product contained grafted maleic anhydride: 0.072 mmole/gram: maleic acid; 0.013 mmole/gram. The average melt flow of the same three samples was 55.3 gm/10 minutes as measured with a 10.0 kg weight at 230° C.

EXAMPLE XIII

Following the process of the invention, ethylene-propylene copolymer was maleated and then imidized in a single extruder-reactor to prepare a modifier for polymer blends containing styrone maleic anhydride copolymers.

The ethylene-propylene copolymer B was fed from a drying extruder into the hopper of an extruder-reactor configured as shown in FIG. 2 at a rate of 60 kg/hr. Water was also fed into the hopper at a rate of 100 g/hr. Liquified maleic anhydride was fed into the reactor at a rate of 0.8 kg/hr through an injection valve at about L/D=7. LUPERSOL® 130 was fed at a rate of 30 g/hr through an insection valve at about L/D=10. The LUPERSOL® 130 was fed as a 20 wt. % solution in ISOPAR® V mineral oil. Amine B was fed into the second reactor zone at a rate of 3.0 kg/hr at about L/D=46.

The pressures in the four vents were about 20 to 85 kPa below atmospheric pressure. Stripping was further assisted by injection of nitrogen at a rate of 1 kg/hr at L/D=32, 40, 58 and 64. Temperature within the barrel was maintained at between 295 and 305° C.

Samples of the pelletized product were taken every ten minutes and were examined by infrared spectroscopy as described in Example II. The imide content of the product, based on an average of three samples was 0.085 mmole/gram. The average melt flow of the same three samples was 24.0 gm/10 minutes as measured with a 10.0 kg weight at 230° C.

It will be noted that the product imide content is equivalent to the total of the maleated species in the product of Example XII, indicating efficient removal of unreacted maleic anhydride in the first vent zone (vents 1 and 2) and a product purity, measured as indicated in Example II, of 100%.

EXAMPLE XIV

In this comparative example, an alternative route to the composition made in example XIII was examined. A maleated copolymer B, which had been prepared in a previous extruder grafting process was imidized in the bulk phase in a Brabender mixer.

The maleated copolymer B (0.07 mmole/gram of grafted maleic anhydride; 250 grams) was brought to 210° C. in a 300 ml Brabender mixer. Amine B (1.5 grams ) was added and the mixing was continued at 210° C. for two minutes. The discharged material was allowed to cool to room temperature. After several hours it was found that the material was crosslinked. It would not form a film when pressed at 140° C. under a pressure of 500 psi. The material was discarded and was not further evaluated.

The reaction was repeated except that the discharged product was immediately cooled With dry ice. A thin film could be pressed at 140° C. under a pressure of 500 psi. The infrared spectrum of product measured on the film was similar to that of the product from example XV. The product was not extruded from the die of the melt flow rate instrument under a load of 10.0 kg at 230° C.

It can be concluded that crosslinking occurs during the slow cooling down of the solid polymer mass during and after discharge from the Brabender mixer. It should be appreciated that the discharge requires disassembly of the mixer and can be prolonged. Further crosslinking can occur during the six minute conditioning period at 230° C. which is part of the standard melt flow rate procedure and this leads to a zero melt flow rate measurement for the product which had been cooled rapidly with dry ice.

The rapidly cooled product did flow at 140° C. indicating that, in spite of the zero melt flow rate, it may be processable. Its evaluation as a toughener for styrene maleic anhydride copolymers is described in example XVI.

In contrast to the crosslinking problems noted in this example, the product from Example XIII showed a measurable melt flow rate. The difference may be due to the rapid and efficient cooling of the product in the underwater pelletizer used in the finishing portion of the extruder reactor process, described in Example XIII.

EXAMPLE XV

The products from examples XIII and XIV were evaluated as tougheners for DYLARK™ 232, a styrene maleic anydride copolymer with a maleic anhydride content of 8%.

Blends of DYLARK™ 232 (75 percent by weight) and the modified ethylene-propylene copolymers (25 percent by weight) were made in a Banbury mixer (product from example XIII) or Brabender mixer (product from example XIV) at about 205° C. The room temperature notched Izod impact strength of the blends were 4.8 and 2.1 ft. lbs per inch, respectively, compared to 0.3 ft. lb per inch for DYLARK™ 232, itself.

The product of the present invention (example XIII) gives toughening performance superior to that of a product made by an alternative bulk phase process (example XIV).

EXAMPLE XVI

The product from Example XIII, was additionally evaluated as a toughener for DYLARK™ 332, a styrene maleic anhydride copolymer having a maleic anhydride content of 14 percent by weight.

A blend of DYLARK™ 332 (75 percent by weight) and the product from example XIV (25 percent by weight) was made in a Banbury mixer (10 minutes mixing time with a dump temperature of about 205° C). The room temperature notched Izod impact strength of the blend was 4.2 ft. lbs per inch, compared to 0.3 ft. lbs per inch for DYLARK™ 332 itself.

EXAMPLE XVII

In this example, the extruder reactor process of the invention is used to prepare a low molecular weight brominated polymer which is useful as a pressure sensitive adhesive. The molecular weight of an isobutylene-paramethylstyrene copolymer is reduced by a peroxide initiated reaction in the first reaction zone. In the second reaction zone, the low molecular weight polymer is the brominated and the molecular weight is reduced even further.

The isobutylene/paramethylstyrene copolymer (containing 5 wt. % paramethylstyrene and having a molecular weight of 300,000) is fed at a rate of 100 Kg/hr into the hopper of an extruder configured as shown in FIG. 2. A peroxide LUPERSOL® 101 from Atochem North America, Inc. (which contains 90% 2,5-dimethyl-2,5-di(t-butylperoxy)-hexane-3) is fed into the reactor at a rate of 200 grams/hour through an injection valve at L/D=7. The pressure in the four vent zones (listed in the order in which the polymer passes through them) are about 0.95, 75 and 15 pKa below atmospheric pressure. Stripping is further assisted by injection of nitrogen at a rate of 1 Kg/hour after the second, third and fourth vent zone at about L/D=40, 58 and 64. Temperature regulators in the barrel are set to maintain the barrel temperature at between 130° and 210° C. in the first reaction zone and to give maximum cooling in the second reaction zone.

In the first run, no bromine is injected into the polymer. The unbrominated product is collected as a viscous fluid and is stored in a drum. Examination of the product by gel permeation chromatography (LGPC) and nuclear magnetic resonance spectroscopy (NMR) shows that molecular weight reduction occurs and that olefin end groups are created. The NMR resonances are similar to those of a mixture of 2,2,4-trimethyl/pentene-1 and -2 indicating that chain breakage occurs at the isobutylene units.

In a second run, the first reaction proceeds as described above. Bromine as a 50: 50 mixture with nitrogen is then fed through am injection valve at about L/D=46, to bring about bromination of the feed copolymer. Additionally a paste made from equal weights of calcium stearate and FLEXON™ oil was fed through a gear pump at about L/D=64, to neutralize any traces of HBr not removed in the vents.

Examination of the product by IR, GPC and NMR shows that (i) molecular weight reduction, additional to that observed in the absence of bromine, has occurred, (ii) bromination has occurred at the para-methylstyrene methyl groups and at the olefinic end groups and (iii) formation of stearic acid by reaction of traces of HBr with calcium stearate has occurred. The quantity of stearic acid formed is less than that stoichiometrically equivalent to the calcium stearate fed.

EXAMPLE XIII

In this example, a series of maleic anhydride grafting reactions of an ethylene-propylene copolymer (VISTALON® 805 HF; 76 wt. % ethylene; MFR (10 kg, 230 C)=10 g/10 minutes) were conducted with and without feed of water into the extruder hopper. The extruder was configured as shown in FIG. 3. Only a single reaction was carried out and this extruder design includes only a single reaction zone. This example serves to demonstrate the superior color of the product obtained when water is a feed. The color was measured by a modification of the yellowness index D (YID) measurement of the standard ASTM D 1925 procedure. In this modification, the product color is measured directly on the pellets produced by the process, rather than on a sample formed by massing the pellets in a press or on a mill. The modified procedure is referred to as "YID on pellets". A low value of YID corresponds to a product with less color. As maleic anhydride grafted copolymers are used in blends with engineering thermoplastics to produce consumer products their color is important and products with low YID are generally preferred.

The ethylene-propylene copolymer pellets (80 kg/h) were fed into the hopper of the extruder reactor, configured as shown in FIG. 3. In runs XVII-a through XVII-f, water was not fed to the extruder reactor. In runs XVII-g through XVII-1, water (100 g/h) was fed into the extruder reactor hopper. Maleic anhydride and LUPERSOL® 130 were fed at about L/D=10 and about L/D=20 respectively. The feed rates are indicated in the Table below. The LUPERSOL® 130 was fed as a 20 wt. % solution in MARCOL™ 52 mineral oil.

Figure 4:
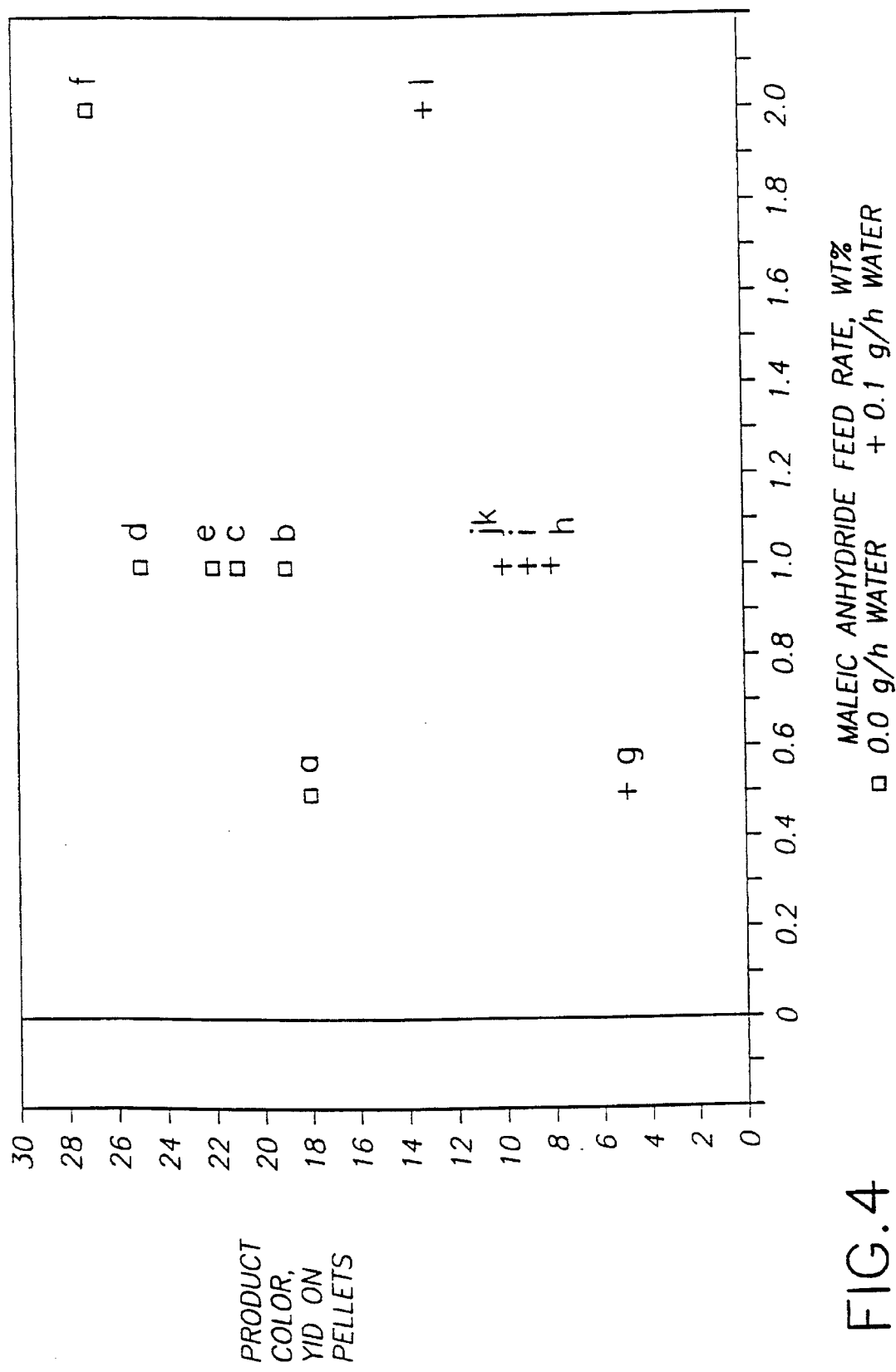
FIG. 4 is a plot of yellowness index on pellets of the products of example XVIII.

The pelletized products were examined by infrared spectroscopy to determine their content of grafted maleic anhydride and maleic acid as indicated in Example 1. Their melt flow rate and YID on pellets was also measured. The tabulated data, in which each data point represents the average of three individual measurements, shows that over a variety of peroxide (LUPERSOL® 130) and maleic anhydride feed rates, the feeding of water leads to consistently better product color (lower YID on pellets). This is shown graphically in FIG. 4.

TABLE

| EXAMPLE | MA FEED wt % | L-130 FEED wt % | WATER FEED wt % | PRODUCT ANHYDRIDE wt % | PRODUCT ACID wt % | PRODUCT MFR g/10 min | PRODUCT COLOR YID ON PELLETS |
|---|---|---|---|---|---|---|---|
| XVII-a | 0.5 | 0.020 | 0.0 | 0.34 | 0.04 | 9.6 | 18 |
| b | 1.0 | 0.005 | 0.0 | 0.35 | 0.05 | 8.6 | 19 |
| c | 1.0 | 0.010 | 0.0 | 0.40 | 0.06 | 8.6 | 21 |
| d | 1.0 | 0.020 | 0.0 | 0.53 | 0.05 | 8.6 | 25 |
| e | 1.0 | 0.040 | 0.0 | 0.68 | 0.06 | 8.6 | 22 |
| f | 2.0 | 0.020 | 0.0 | 0.64 | 0.06 | 6.8 | 27 |
| g | 0.5 | 0.020 | 0.1 | 0.34 | 0.04 | 9.7 | 5 |
| h | 1.0 | 0.005 | 0.1 | 0.31 | 0.06 | 8.9 | 8 |
| i | 1.0 | 0.010 | 0.1 | 0.35 | 0.07 | 8.4 | 9 |
| j | 1.0 | 0.020 | 0.1 | 0.46 | 0.07 | 8.1 | 10 |
| k | 1.0 | 0.040 | 0.1 | 0.59 | 0.07 | 7.1 | 10 |
| l | 2.0 | 0.020 | 0.1 | 0.60 | 0.12 | 4.9 | 13 |

EXAMPLE XIX

The color of the imide products of Examples V and VII were measured as YID on pellets and the values obtained were 73 and 88 respectively. Examples V and VII are identical except for the feed of water at 100 g/h in Example V, while no water was fed in Example VII. As in the case of the non-multiple reactions, described in Example XVIII, the feed of water improves the product color by about 15 YID units measured on pellets.

We claim:

1. A process for modifying a thermopolastic polymer through a series of sequential reactions in an extruder-reactor comprising:

(a) introducing said polymer into an extruder;

(b) conveying said polymer into a reaction zone wherein said polymer undergoes one of the sequential reactions with a first reagent;

(c) conveying said polymer into a first purification zone wherein impurities produced by the reaction of the preceding step are removed from or neutralized in said polymer;

(d) repeating the steps of (b) and (c) on the polymer of step (c) with at least a second and different reagent than the first reagent, until each of said sequential reactions are completed; and (e) conveying said polymer through the rest of the extrusion process, wherein said reaction and purification zones are isolated from each other.

2. The process of claim 1 wherein said polymer is introduced into said reactor in molten form.

3. The process of claim 1 wherein said polymer is melted after introduction into the extruder reactor.

4. The process of claim 1, wherein said polymer is an elastomer.

5. The process of claim 4, wherein said elastomer is selected from the group consisting of ethylene-propylene copolymer and ethylene-propylene diene terpolymer.

6. The process of claim 1, wherein one of said sequential reactions is the grafting of one or more functional compounds to said polymer in the presence of a free radical initiator.

7. The process of claim 6, wherein said functional compound is unsaturated and wherein said functional compound includes functionality selected from the group consisting of carboxylic acid functionality and a derivative of said carboxylic acid functionality.

8. The process of claim 7, wherein said functional compound is selected from the group consisting of acrylic acid and an acrylic acid derivative.

9. The process of claim 7, wherein said functional compound is selected from the group consisting of maleic anhydride and maleic anhydride derivatives.

10. The process of claim 1, wherein the sequential reactions comprise grafting a functional compound to said polymer followed by reacting said grafted functional compound containing polymer with a reactive compound.

11. The process of claim 10, wherein said functional compound is unsaturated and wherein said functionality is-selected from the group consisting of carboxylic acid anhydride functionality and a derivative of said functionality and wherein said reactive compound is a nitrogen containing compound.

12. The process of claim 10, wherein said functional compound is maleic anhydride and said reactive compound is a primary amine.

13. The process of claim 12, wherein said primary amine is selected from the group consisting of 4-(3-aminopropyl) morpholine and 1-(2-aminoethyl) piperazine.

14. The process of claim 10 wherein said functional compound is maleic anhydride and said reactive compound is aminoethylpiperazine.

15. The process of claim 1 further comprising the step of drying said polymer before it is introduced into said extruder-reactor.

16. The process of claim 1 further comprising the step of injecting inert gas into said polymer to assist in the removal of said volatile impurities.

17. The process of claim 16, wherein said inert gas is nitrogen.

18. The process of claim 17, wherein said nitrogen is injected into said polymer immediately before said purification zone.

19. The process of claim 1 further comprising the step of pelletizing the polymer as it is extruded from the extruder-reactor.

* * * * *

UNITED STATES PATENT AND TRADEMARK OFFICE
CERTIFICATE OF CORRECTION

PATENT NO. : 5,552,096
DATED : September 3, 1996
INVENTOR(S) : Richard S. Auda, et al It is certified that error appears in the above-indentified patent and that said Letters Patent is hereby corrected as shown below:

Column 7, line 29 and 30, "preferably about 5-05 wt. %" to "preferably about 5-0.5 wt. %", see same page, same line, "15-0.5%".

Column 15, line 42, "phenolthioesters" to "phenolthioethers", see corresponding examples.

Column 28, line 44 and 45, "2,5-dimethyl-2,5-di(t-butylperoxy)-hexane-3" to "2,5-dimethyl-2,5-di(t-butylperoxy)-hexane", see page 21 for comparison.

At Col. 6, line 18, for the word "maleorion" substitute the word "maleation".

At Col. 6, line 25 for the word "nucleopnilic" substitute the word "nucleophilic".

At Col. 6, line 32, for the word "nucleopnilic" substitute the word "nucleophilic".

At Col. 7, line 5, for the word "hydrogenarea" substitute the word "hydrogenated".

At Col. 7, line 21, for the word "styfete" substitute the word "styrene".

At Col. 9, line 2, for "0,925" substitute "0.925".

At Col. 13, line 38, for the word "arthydride" substitute the word "anhydride".

At Col. 13, line 42, for the word "theological" substitute the word "rheological".

At Col. 13, line 49, for "0,001" substitute "0.001".

At Col. 14, line 66, for the word "hydracarbon" substitute the word "hydrocarbon".

UNITED STATES PATENT AND TRADEMARK OFFICE
CERTIFICATE OF CORRECTION

PATENT NO. : 5,552,096
DATED : September 3, 1996
INVENTOR(S) : Richard S. Auda, et al It is certified that error appears in the above-indentified patent and that said Letters Patent is hereby corrected as shown below:

At Col. 15, line 50, for "compound-" substitute "compound.".

At Col. 17, line 55, for the word "suan" substitute the word "sum".

At Col. 19, line 19, for "modifiers-" substitute "modifiers.".

At Col. 21, line 21, for "0,001" substitute "0.001".

At Col. 22, line 44, for the word "theological" substitute the word "rheological".

At Col. 22, line 62, for the words "ethylen-epropylene" substitute the words "ethylene-propylene."

At Col. 24, line 20, for "not.=" substitute "not.".

At Col. 24, line 28, for "0,127" substitute "0.127".

At Col. 25, line 62, for the text "a s ingle" substitute the text "a single".

At Co. 26, line 27, for the text "bas is" substitute the word "basis".

At Col. 27, line 38, for the word "With" substitute the word "with".

UNITED STATES PATENT AND TRADEMARK OFFICE
CERTIFICATE OF CORRECTION

PATENT NO. : 5,552,096
DATED : September 3, 1996
INVENTOR(S) : Richard S. Auda, et al It is certified that error appears in the above-indentified patent and that said Letters Patent is hereby corrected as shown below:

At Col. 29, line 37, for the text "EXAMPLE XIII" substitute the text "EXAMPLE XVIII".

Signed and Sealed this

Eighteenth Day of March, 1997

Attest:

BRUCE LEHMAN

Attesting Officer  Commissioner of Patents and Trademarks